United States Patent [19]

Cartossi

[11] 4,029,253
[45] June 14, 1977

[54] METHOD OF HEAT AND PRESSURE BONDING OF PLATES OF HEAT CONDUCTIVE METAL ONTO STAINLESS STEEL SURFACES

[75] Inventor: Nando Cartossi, Novara, Italy

[73] Assignee: Walter Cartossi S.p.A., Ornavasso, Novara, Italy

[22] Filed: Aug. 18, 1975

[21] Appl. No.: 605,540

Related U.S. Application Data

[63] Continuation of Ser. No. 343,840, March 22, 1973, abandoned.

[30] Foreign Application Priority Data

Apr. 22, 1972 Italy ................................. 23434/72
Aug. 4, 1972 Italy ................................. 27923/72

[52] U.S. Cl. .............................. 228/175; 228/193; 228/212; 228/243
[51] Int. Cl.² .......................................... B23K 1/04
[58] Field of Search .......... 228/175, 176, 178, 190, 228/212, 237, 243, 246, 252, 141, 233; 193

[56] References Cited

UNITED STATES PATENTS

| | | | |
|---|---|---|---|
| 2,718,690 | 9/1955 | Ulam ................................. | 228/175 |
| 2,908,073 | 6/1957 | Dulin ................................. | 228/243 X |
| 3,173,202 | 3/1965 | Farber ................................. | 228/190 X |
| 3,228,103 | 1/1966 | Shewmon ................................. | 228/175 X |
| 3,292,256 | 12/1966 | Morgan ................................. | 228/243 X |
| 3,295,197 | 1/1967 | Bunn et al. ................................. | 228/175 X |
| 3,475,811 | 11/1969 | Clarke et al. ................................. | 228/243 X |
| 3,481,023 | 12/1969 | Jost et al. ................................. | 228/190 |

Primary Examiner—Roy Lake
Assistant Examiner—Paul A. Bell
Attorney, Agent, or Firm—Hill, Gross, Simpson, Van Santen, Steadman, Chiara & Simpson

[57] ABSTRACT

A method of heat and pressure bonding plates of heat conductive metal onto stainless steel bottom surfaces of containers by placing the plates of heat conductive metal of no greater area than the stainless steel surface to be covered into position on the stainless steel surface area, heating the assembly to near the fusion temperature of the heat conductive metal immediately whereafter while the assembly is still at said temperature applying bonding pressure to the assembly. During the pressure bonding, the perimeter of the heat conductive metal plate is confined against spreading to assure uniformity of pressure application and bonding efficiency throughout the laminar area of the assembly and to utilize a die cavity to confine an edge of the plate material thus maintaining the diameter of the edge of the plate.

10 Claims, 6 Drawing Figures

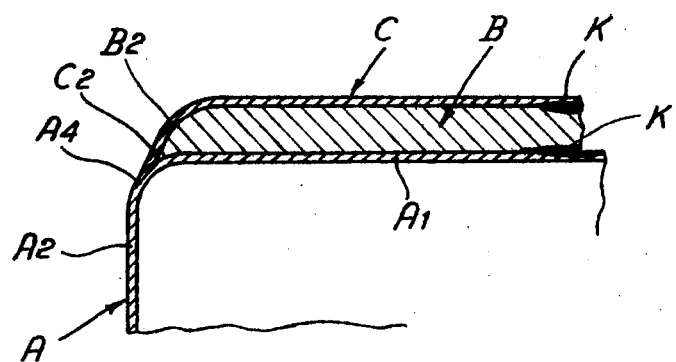
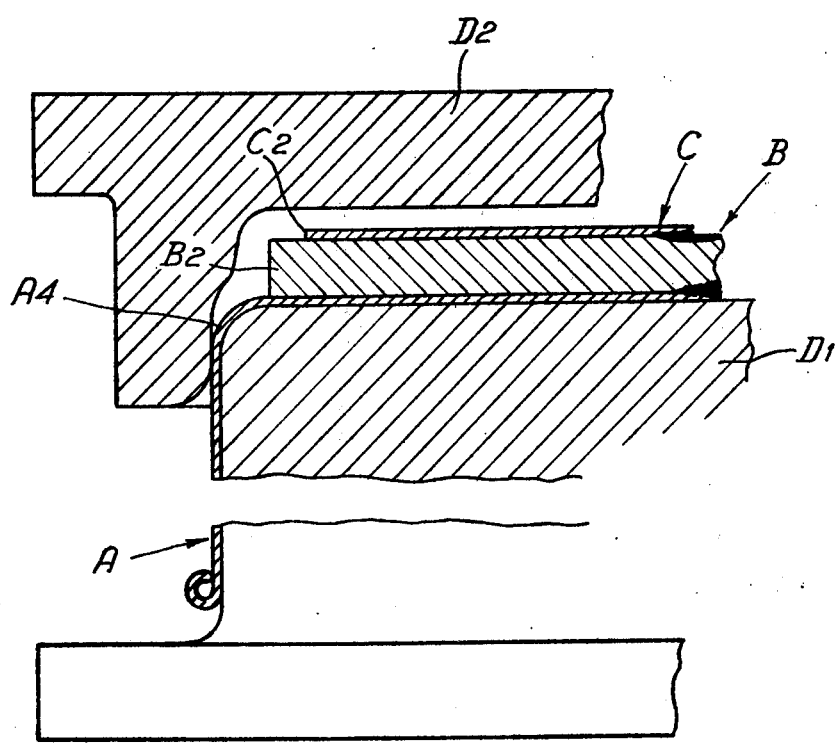

METHOD OF HEAT AND PRESSURE BONDING OF PLATES OF HEAT CONDUCTIVE METAL ONTO STAINLESS STEEL SURFACES

This is a continuation of application Ser. No. 343,840, filed Mar. 22, 1973 and now abandoned.

The present invention concerns a process for firmly and continuously connecting heat-conducting metal onto stainless steel surfaces. To meet certain requirements, for instance to provide stainless steel containers having a heat-conductive bottom, wherein the present invention is particularly though not exclusively useful, it is necessary to connect the two materials concerned durably and continuously to each other — it being generally known that the physical characteristics of said materials are such as to render the mutual connection thereof both difficult and laborious — as the above-mentioned containers have to meet not only thermal but also operational requirements, i.e., and inseparable and continuous connection, resistant to prolonged use of the container, in particular to resist sudden changes in temperature, which are very frequent in use of the article.

The processes known in the art, adapted to effect union of stainless steel either with aluminum or with copper, are unsatisfactory and unpractical, as they fail to ensure a firm bond and the continuity of the materials concerned; or otherwise, they involve lengthy and complicated operations, some of which are even dangerous for the operator, as bursting and other drawbacks can occur.

Furthermore, prior processes are expensive and hence their field of application restricted, in particular when low-priced finished stainless steel products have to be manufactured.

A typical, although not exclusive case is that of the production of kitchen- and tableware for the household, the bottom whereof must be heat-conductive and its price competitive.

The scope of the present invention is to solve the above mentioned problems and still others and to allow for the connection of stainless steel surfaces of any type with heat conductive elements having a well defined geometric contour, in such a way that said contour is maintained also after the performance of the coupling operation which ensures a firm, continuous and lasting bond of the two above-mentioned metal surfaces one to the other, by means of simple, safe and hence enconomically competitive operations.

Further according to the present invention, it is possible to bond, to any desired stainless steel surface, heat-conductive materials such as foils or plates of any desired form and thickness, for instance aluminium and copper foils and plates, thus facilitating the heating of the objects concerned by convection, in particular of stainless steel containers, whereby said heat conveying means can be laid and arranged on the stainless steel surface in the desired position and in relation to the end use of the product concerned.

Still another problem is taken into consideration and solved by the present invention, said problem concerning the protection of the heat-conductive plate. Said plate undergoes quick wear, since the object provided with the plate concerned, such as, for instance, a container, requires the use of a flame to heat it, which, in most cases, develops corrosive gases. Furthermore the container concerned comes frequently in contact with corrosive liquids, which alter and destroy the heat conductive plate, due to its particular consistency. The heat conductive plate, owing to the influence of heat, is subject to oxidation, with a consequent limitation of the heat conveying coefficient.

The process according to the present invention, wherein the mutual bonding between the stainless steel surfaces and the heat conveying material is effected by means of the simultaneous action of heat and of a pressure, is characterized in that the heat conveying metal part or parts are fixed in the desired position on the stainless steel supporting surface in such a way that said mutually bonded parts are allowed to expand freely; in submitting the so prepared elements to the action of heat; to heat said elements up to high temperatures, i.e., almost up to the melting temperature of the heat conductive parts; in applying, to the element concerned, immediately after the attainment of said heating temperature, at least an impact-pressure, whereas the edges of said heat conductive parts are retained during the application of the impact-pressure in such a way as to exert and transmit said impact-pressure to each of the heat conveying surfaces which are retained in a co-active condition and which are adhered to the stainless steel support, in order to realize a stable and inseparable connection between the parts concerned.

It is to be understood that the above mentioned informative inventive idea can be realized in a large number of different embodiments, all of which falling in the domain of protection of the present application. For instance, to ensure an unrestricted and uniform expansion of the steel support and of the heat conductive parts, a connection between said parts is advantageously effected by means of an electric welding operation, preferably by means of a resistance or spot-welding, to ensure the necessary mechanical connection between said parts which, on the other hand, are allowed to expand freely during the pre-heating operation.

The position of the welding to join the metal parts to each other can be provided in the most advantageous position with respect to the geometric outline of the heat conductive metal parts concerned; for instance, in the case of a regular geometric figure (polygon or circle), the welding joint is executed in the central area or in a peripheral area with respect to the central area.

For the purpose of ensuring the desired union between the heat conductive part and the stainless steel support, in particular to limit machining of the metal surfaces to be connected, a thin heat conductive metal foil is inserted between said surfaces, previous to heating the two parts to be connected and to coupling said parts to each other.

For the purpose of protecting such part of the heat conductive material against the corrosive agents (such parts being generally applied at the outside of the container or support of stainless steel), the free surface of said heat conductive plate is provided with a protective coat of stainless steel. Said coat is adhered continuously to the heat conductive metal surface during the operation which is performed to connect said surface to the stainless steel support of the heat conductive plate.

According to the invention, the application of the protective coat for the heat conductive plate is carried out by using a bottom plate or the like of stainless steel which has an advantageously reduced contour line as compared to that of the heat conductive plate; said bottom plate is fixed to said heat conductive plate and the whole is submitted to the action of heat, while exerting an impact pressure on said parts, in such a way that said pressure causes the metal of said heat conductive plate of the protecting bottom plate to flow toward the periphery of the stainless steel support, in order to realize not only a firm connection of the three above-mentioned parts, but also the enlargement and spreading of the protective plate, in such a way that the edge of said protective bottom plate co-operates with and engages the wall of the stainless steel support, thus completing the protective coat for the heat conductive plate.

The tool designed to practice the process according to the present invention is characterized by a fixed and a movable part, at least one of which has at least one recess to reproduce, in the negative, the contour and the shape of the heat conductive part, whereas the edge of said recess is provided with a surface to sealingly engage the face of the stainless steel support, in order to retain said heat-conducting material when said parts are subjected to the impact-pressure.

The invention will be now explained with reference to certain preferred embodiments of the process and to the annexed drawing showing, by way of example, a mold designed to effect the connection of a stainless steel container with a heat-conductive metal part.

In the drawing,

FIG. 5 is a partial cross-section of a different embodiment of the container.

FIG. 6 is a fragmental sectional elevational view showing the molding dies for attaining the container according to FIG. 5.

Figure 1:
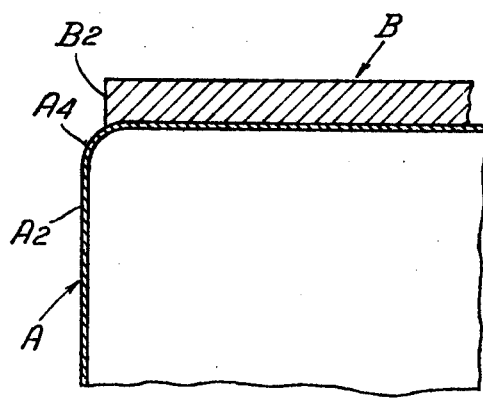
FIGS. 1 to 4 show in a schematic cross-section several characteristic steps of the process according to the present invention.

With reference to the figures of the drawing, said figures show a stainless steel container A, to the bottom A1 whereof a bottom-plate B, made of a heat-conductive material, for instance of aluminum, is applied. In the present case, it is assumed that bottom A1 and hence also bottom plate B are circular, with the diameter thereof substantially equal to the diameter of bottom surface A1, to which said bottom plate B is applied.

The thickness of bottom plate B may vary according to the requirements of the end-user; for instance, said thickness may vary between 1:2 and 1:20, referred to the thickness of supporting wall A1 of stainless steel.

It should be noted that, according to the present invention, no practical limit is set to the use of stainless steel for the supporting surface $A_1$; in other words, any desired type of stainless steel such as available on the market can be used, without the need to apply a particular treatment to the surface thereof. In other words, the surface of stainless steel can be either polished or dull.

However, in practice it is both advantageous and convenient to provide a dull or sanded surface A1 for the stainless steel support.

The part which is first applied to container A is the aluminum bottom plate B, in such a way that the outline of said bottom plate is situated exactly in the desired position. In the case shown in the drawing, the edge $B_2$ of the bottom plate is maintained at a uniform distance from the peripheral wall $A_2$ of the above-mentioned container A.

Bottom plate B is advantageously fixed to support $A_1$, preferably by means of welding of K which is effected within the central area of support $A_1$, so as to attain the mechanical union in a central area, where the union between supporting surface $A_1$ and the surface of bottom plate B is complete from all points of view.

The above mentioned mechanical union between the stainless steel support $A_1$, and bottom plate B, which is made of a heat-conducting material, is executed in a central area which is such that the two parts concerned are allowed to expand freely, as well as to deform during the heating operation which will be described in the following.

As previously mentioned, welding K can be of any known type. The union of the two surfaces is advantageously attained by means of an electric resistance welding joint.

Obviously, instead of providing the welding joint K in the central area, two or more than two conveniently arranged and situated welding points can be provided, in such a way as to obtain the aforementioned ends and, in particular, to control the expansion of the materials which constitute support $A_1$ of bottom plate B.

Figure 2:
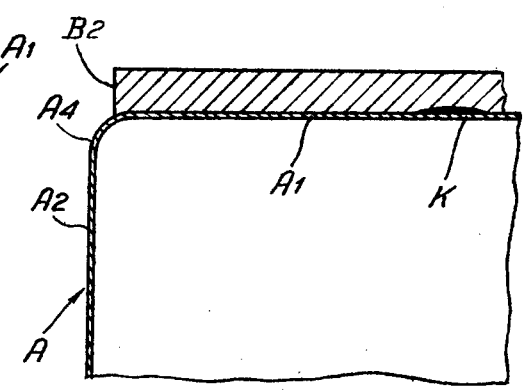

The so prepared element A–B, which consists of a container A and of bottom plate B (see FIG. 2) is then introduced into a pre-heating furnace or oven of an advantageous type, wherein the assembly is heated to a temperature which is generally near the melting temperature of the material which constitutes heat-conducting part B. If bottom plate B is made of aluminum, the pre-heating temperature of assembly A–B is comprised between 500° and 650° C; if said bottom plate is made of copper, said temperature is increased up to 900°–1000° C. The pre-heating operation is carried out in such a way that the above-mentioned maximum temperature is attained throughout the structure of support A1 and bottom plate B. Then assembly A–B is removed from the oven and in immediate succession laid on the fixed part $D_1$ of the tool or die assembly which is appropriately secured to the fixed table or bed 5 of a press which provides the necessary, advantageous features. The fixed part D1 forms a half-mold or male die, the profile, i.e., the shape whereof is such as to correspond to the inside of container A and, in particular, to the area of the supporting wall A1, in such a way that the lower face of said wall conforms to the surface of said half-mold D1. Half-mold D1 is combined with a complementary counter-mold or die D2 which constitutes the movable part of the tool and which is advantageously fixed to the ram (not shown) of the press concerned.

Figure 3:
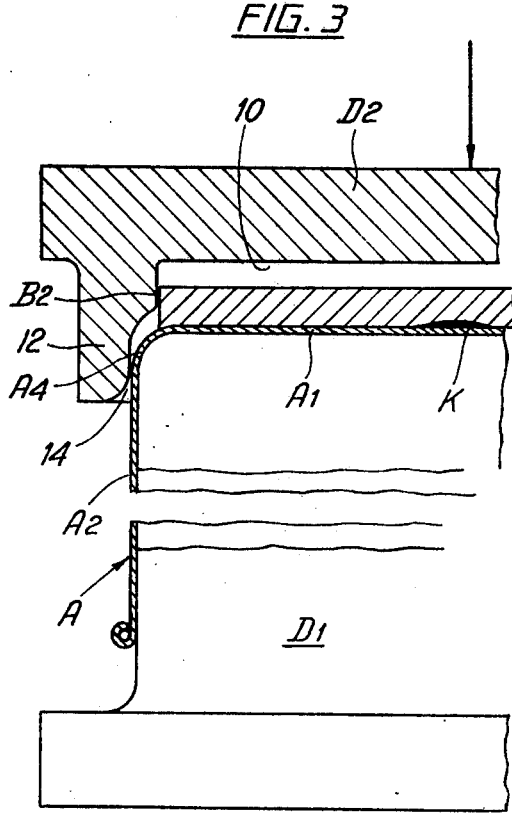
Figure 4:
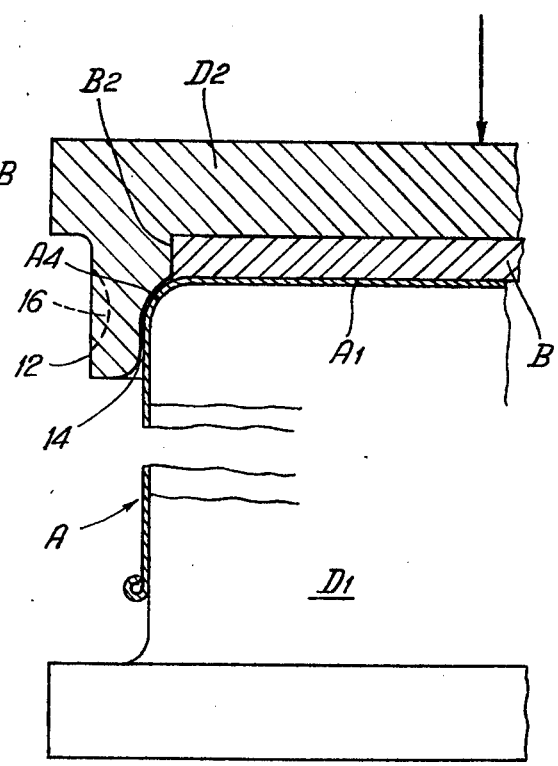

It should be noted that counter-mold D2 requires a special execution, to ensure the desired union between supporting wall A1 and bottom plate B; i.e., counter-mold D2 has a cavity 10 which is so shaped as to be complementary to the contour line of bottom-plate B and to provide an advantageous depth to house entirely and constrains the above mentioned plate. Furthermore, counter-mold D2 has a peripheral wall 12 (see FIGS. 3 and 4) providing a delimiting contour which substantially corresponds to the original contour B2 of bottom plate B. Furthermore, said peripheral wall 12 has an annular extension 14 provided with an advantageously tapered or shaped surface, such as to conform to the outer surface of juncture A4 between the bearing surface A1 and peripheral wall A2 of container A, i.e., between the annular surface 14 and juncture surface A4, it is necessary to provide a seal, to prevent the displacement of the metal of bottom plate B from cavity 10 of counter-mold D2, as explained in the following.

To ensure a firm but slightly yieldable grip between profiled edge 14 and juncture surface A4, peripheral wall 12 can be provided with advantageously shaped relief recess 16, to realize a certain elasticity during the stamping operation. Furthermore, in relation to the features attained by the embodiment of the process, peripheral wall 12 can be provided with stiffening or reinforcing rings.

As previously mentioned, assembly A-B is extracted from immediately and without interruption mounted on the fixed mold D1. This operation must be performed within an extremely short lapse of time, to prevent the assembly from cooling. According to the present invention said requirement can be met rather easily, owing to the fact that assembly functionally A-B is functionally integral. Once assembly A-B has been mounted on mold D1, the press is operated, in order to lower counter-mold D2 rapidly, i.e., almost instantaneously; in other words within the shortest possible delay, in such a way that recess 10 of said counter-mold receives bottom plate B and exerts on same an extremely high impact-pressure in the range of from 2000 to 3500 Kg/cm$^2$, said pressure acting instantaneously upon all of the sections of the two surfaces confronting provided by elements A1-B.

It should be noted that, when the movable part D2 of the mold is lowered, cavity 10 first receives bottom plate B and successively starts contacting bottom wall 10 of counter-mold D2 with the upper face of said bottom-plate. An impact-pressure is applied to the material of bottom plate B which increases most quickly and within a few instants, due to the above-mentioned reasons. At the same time, profiled edge 14 comes in engagement with the peripheral area A4 of container A, in such a way that the successive pressure which is exerted on bottom plate B is transmitted directly against supporting wall A1 of the container. Due to the high pressure, that the bottom plate B is subjected to, and to the quick action of said pressure, as well as to the fact that bottom plate B is united to supporting wall A1 by means of central welded area K, the bonding of the two surfaces to each other and the union thereof, is attained in a perfect and satisfactory way, i.e., so that the connection as obtained thereby extends continuosly over the whole surface. The union of the above-mentioned surfaces is attained partly also by fusion, as both bottom plate B and container A, are at high temperatures.

If desired, particularly in order to stabilize the so-obtained connection, a second or a third pressure, having an advantageous value, is exerted successively on the so-connected area, said pressure being such as to ensure a level connection. Successively, object A-B is removed and it practically requires no finishing operations, also because the area by means of which steel support A1 is joined to bottom plate B has no discontinuity whatever, but is smooth and adheres to wall A1 of container A.

According to an alternate embodiment of the invention, designed to limit and to prevent machining of the object obtained, as well as to guarantee the evenness of the opposed surfaces of support A and bottom plate B respectively, the invention provides for the insertion, between said faces to be firmly connected to each other, of a thin metal foil, having, for example, a thickness of 0.02 -0.6 mm and provided with substantially the same features as those of the metal of which the above-mentioned bottom plate is made. For instance, if bottom plate B is made of aluminum, use is made of a thin foil of purest aluminum, having a 99.5 percent purity and a thickness of 0.5 mm. Said thin aluminum foil is so realized that the contour thereof is substantially identical with that of bottom plate B. Said parts are connected to each other and to upper wall A1 by means of a welding K. Also in this case bottom plate B is connected to and coupled with supporting surface A1 as above described and said connection is assured from all points of view since, when said bottom plate is submitted to the action of heat and to the impact-pressure, an intensive fusion of the two heated metals occurs. The so obtained object is finished and completed according to the requirements of the different end users.

Considering now a further, different embodiment of the invention, as shown in FIGS. 5 and 6 (wherein such parts as correspond to those of FIGS. 1 to 4 are marked with the same reference numerals), bottom plate B, for instance of aluminum, is provided with a protective sheath plate C of stainless steel having the same characteristics as those of container A.

FIG. 6 shows said parts previous to the mutual connection thereof and it will be noted that edge C2 of bottom plate C is advantageously arreared with respect to edge B2 of bottom plate B made of a heat conductive material.

FIG. 5 shows the definite arrangement of the edges of the above-mentioned parts, according to which edge B2 is adjacent and adherent to the curved function A4 of container A. Correspondingly, also edge C2 of bottom plate C, when subjected, during the coupling operation, to the dynamic action of the impact pressure, is rolled and caused to flow outwards, together with the heat conductive bottom plate B situated below, in such a way that edge C1 of said protective bottom plate C is spread out and adhered to junction A4 of container A.

each other as previously described: i.e., welding K is executed first, to connect the two bottom plates B and C respectively, to container A. Then container A, together with the above-mentioned bottom plates, is heated and then submitted to an impact pressure, in order to effect both the coupling of the three said parts to each other, and the rolling of the two bottom plates B and C in such a way that edge C2 of bottom plate C is firmly bonded to the outer, curved edge A4 of said container A.

If desired, edge C2 of bottom plate C can be tightly connected to edge A4 or to the outer wall of container A by means of a successive heating or hammering operation. Another advantageous feature of the invention is, that protective bottom sheath plate C, besides fulfilling the above described requirements, provides and ensures a good heat conveying coefficient through the so-obtained composite bottom, in particular when the heat source is concentrated in a very restricted area of said composite bottom. It is further possible to limit the thickness of bottom plate B made of a heat conductive material and to obtain nevertheless good heat conducting coefficients, even if said bottom plate B is provided with a sheath of stainless steel. The so realized object is then submitted to a cleaning and buffing operation, according to the end-use of said object.

It is obvious that the protection claimed with the present application extends not only to the process but also to the tool designed to practice said process and to the object realized by means of the process concerned, according to which one of the surfaces of said stainless steel object retains, in inseparable union, one or more shaped elements made of a heat-conveying material, which are bonded by means of the process as hereinbefore shown and described.

Amendments and variations can be brought to the process, in particular to the above-described mold, according to the end-use of the object having a coupled surface made of a heat-conductive material, without exceeding the domain of the present invention and hence the limits of this patent application.

I claim:

1. A method of heat and pressure bonding a bottom plate of heat conductive metal onto the bottom surface of a stainless steel container having a peripheral wall of larger diameter than the bottom surface and a connecting surface sloping from the bottom surface to the peripheral wall, the method comprising:
    placing into laminar assembly with said bottom surface a plate of heat conductive metal of an original diameter substantially the same as the diameter of said bottom surface and with the edge of the plate spaced from the diameter of said peripheral wall by substantially the width of said connecting surface;
    heating the assembly to nearly the fusion temperature of the heat conductive metal of said plate;
    while the assembly is at said temperature applying bonding pressure uniformly over the full area of the plate to effect fusion bonding of the plate to said bottom surface;
    closely confining the perimeter of the plate for firmly retaining the edge substantially against spreading from its original diameter and holding said plate and said bottom surface against relative displacement while applying said bonding pressure whereby to assure uniformity of pressure and bonding of the plate throughout its area to said bottom surface.

2. A method according to claim 1, comprising before heating of the assembly spot welding the plate to said bottom surface at generally the center of the assembly whereby to hold the plate and bottom surface against relative displacement, leaving the remainder of the plate unattached during the heating whereby to permit free relative expansion movement of the plate and the bottom surface at the laminar interface beyond the spot welding.

3. A method according to claim 1, comprising supporting sad container on a conforming male die member, engaging said plate within a cavitated die member having a pressure surface of substantially the same diameter as the plate and a confining surface of substantially the same diameter as the plate about the perimeter of the plate, and applying said bonding pressure by relatively thrusting said die members toward one another.

4. A method according to claim 1, wherein the bonding pressure is applied by impact of extremely short duration and in an intensity in the range of 2,000 to 3,500 Kg/cm$^2$.

5. A method according to claim 4, wherein said plate of heat conductive metal comprises aluminum, and heating of the assembly is effected in a temperature range between 500° and 650° C.

6. A method according to claim 4, wherein said plate of heat conductive metal is copper, and effecting said heating of the assembly in a temperature range of 900° to 1,000° C.

7. A method according to claim 1, comprising applying over said plate a stainless steel sheath, subjecting the sheath in assembly with the plate and said stainless steel surface to said heating to nearly the fusion temperature of the heat conductive metal of the plate, and fusing the sheath to said connecting surface.

8. A method of heat and pressure bonding a bottom plate of heat conductive metal onto the bottom surface of a stainless steel container having a peripheral wall of larger diameter than the bottom surface and a connecting surface sloping from the bottom surface to the peripheral wall, the method comprising:
    placing into laminar assembly with said bottom surface a plate of heat conductive metal of an original diameter substantially the same as the diameter of said bottom surface and with the edge of the plate spaced from the diameter of said peripheral wall by substantially the width of said connecting surface;
    heating the assembly to nearly the fusion temperature of the heat conductive metal of said plate;
    while the assembly is at said temperature placing the assembly on a male die member which conforms to the inside of the container including said bottom surface and the perimeter wall as well as said connecting surface;
    applying a cavitated die member over and about the assembly as assembled on said male die member, with a cavity of the cavitated die member of substantially conforming depth and diameter as said plate into engagement with said plate and with surfaces of the cavitated die member substantially conforming to said perimeter wall and said connecting surface contiguous to respectively the peripheral wall and the connecting surface;
    applying relative bonding pressure to the assembly by and between said die members whereby said cavitated die member applies the bonding pressure over the full area of the plate to effect fusion bonding of the plate to said bottom surface and also closely confines the perimeter of the plate for firmly retaining the edge substantially against spreading from its original diameter while applying the bonding pressure whereby to assure uniformity of pressure and bonding of the plate throughout its area to said bottom surface.

9. A method according to claim 8, comprising spot welding the plate substantially centrally to the bottom surface before heating the assembly, leaving the remainder of the plate unattached to the bottom surface for relative expansion movement during the heating and also for retaining the assembly against relative displacement of the plate and surface during placement of the assembly between the die members.

10. A method according to claim 9, including applying a stainless steel sheath to said plate and attaching it to the plate by said spot welding, the sheath, and applying bonding pressure of said die members to fuse the sheath to said connecting surface and in enclosing relation about the perimeter of the plate.

* * * * *